United States Patent
Lee

(10) Patent No.: US 9,977,218 B2
(45) Date of Patent: May 22, 2018

(54) LENS DRIVING DEVICE, CAMERA MODULE AND OPTICAL APPARATUS

(71) Applicant: LG Innotek Co., Ltd., Seoul (KR)

(72) Inventor: Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 162 days.

(21) Appl. No.: 15/004,449

(22) Filed: Jan. 22, 2016

(65) Prior Publication Data

US 2016/0216476 A1  Jul. 28, 2016

(30) Foreign Application Priority Data

Jan. 22, 2015  (KR) .................. 10-2015-0010314

(51) Int. Cl.
 *G02B 7/02* (2006.01)
 *G02B 7/08* (2006.01)
 *G02B 27/64* (2006.01)
 *H02K 41/02* (2006.01)

(52) U.S. Cl.
 CPC ............. *G02B 7/08* (2013.01); *G02B 27/646* (2013.01); *H02K 41/02* (2013.01)

(58) Field of Classification Search
 CPC ........ G02B 27/646; G02B 7/08; G02B 7/102; G02B 15/173; G02B 7/10; G02B 7/021; G02B 7/04; H02K 41/02; G03B 3/10; G03B 17/14; G11B 7/0932
 USPC ............... 359/642, 676, 694, 696, 699–701, 359/811–830
 See application file for complete search history.

(56) References Cited

U.S. PATENT DOCUMENTS

| | | | |
|---|---|---|---|
| 2010/0246035 A1* | 9/2010 | Yamashita | G02B 7/023 359/824 |
| 2011/0262121 A1* | 10/2011 | Yanagisawa | G02B 7/08 396/55 |
| 2013/0136438 A1* | 5/2013 | Lee | G03B 3/10 396/133 |
| 2014/0313582 A1* | 10/2014 | Cheng | G02B 7/09 359/557 |

* cited by examiner

*Primary Examiner* — Thomas K Pham
*Assistant Examiner* — Vipin Patel
(74) *Attorney, Agent, or Firm* — Saliwanchik, Lloyd & Eisenschenk

(57) ABSTRACT

A lens driving device is provided, including: a holder member; a bobbin disposed at an inner side of the holder member; a magnet disposed at the holder member; a first coil unit disposed at the bobbin, and facing the magnet; a first support member coupled to the holder member and the bobbin; and a detection sensor disposed at the bobbin, and configured to detect magnetic force of the magnet, wherein the magnet includes a facing surface and an opposite surface disposed at an opposite side of the facing surface, wherein a polarity of the facing surface and a polarity of the opposite surface are different from each other, wherein a polarity of an upper portion of the facing surface and a polarity of a lower portion of the facing surface are different from each other. According to an embodiment, Hall output detected by the detection sensor can be enhanced.

20 Claims, 3 Drawing Sheets

LENS DRIVING DEVICE, CAMERA MODULE AND OPTICAL APPARATUS

CROSS-REFERENCE TO RELATED APPLICATION

This application claims the benefit under 35 U.S.C. § 119 of Korean Application No. 10-2015-0010314 filed Jan. 22, 2015, which is hereby incorporated by reference in its entirety.

BACKGROUND OF THE DISCLOSURE

Technical Field

The present exemplary embodiments relate to a lens driving device, a camera module and an optical apparatus.

Background

The technology described in this section is merely intended to provide background information of an exemplary embodiment of the present disclosure, and does not mean the prior art.

A camera module may include an image sensor, a PCB (Printed Circuit Board) configured to deliver electric signals to the image sensor installed on the PCB, an infrared cut-off filter configured to block light in infrared area from being incident on the image sensor, and an optical system including at least one lens configured to deliver an image to the image sensor. Here, a lens driving device configured to perform auto-focusing function and handshake compensation function may be installed in the optical system.

The lens driving device may be composed in a variety of ways. In general, a voice coil motor is commonly used in the lens driving device. The VCM (Voice Coil Motor) operates by an electromagnetic interaction between a magnet fixed in a housing and a coil unit wound on an outer circumferential surface of a bobbin coupled with a lens barrel. The VCM may perform auto-focusing function. An actuator module of such VCM may reciprocatively move in a direction parallel to an optical axis while a bobbin being moved in upward and downward directions is elastically supported by an upper and a first elastic member.

Recently, there has been a requirement to develop a lens driving device configured to swiftly detect an optimal focus position by receiving position information of a bobbin installed with a lens as a feedback.

However, in a case where a detection unit such as a Hall sensor is installed for feedback, the positioning of the Hall sensor may be difficult. Such feature of the conventional art is required to be improved.

BRIEF SUMMARY

According to an exemplary embodiment, a lens driving device having auto focus and handshake compensation functions is provided, the lens driving device is capable of receiving accurate position information of a bobbin and a holder member as feedbacks.

In a general aspect, there is provided a lens driving device, the lens driving device comprising: a bobbin installed ascendable and descendible in relation to an optical axis, where a coil unit is wound on an outer circumferential surface of the bobbin; a holder member including a magnet arranged at a position facing the coil unit; an upper elastic member and a lower elastic member elastically supporting the bobbin, where one end of each of the upper elastic member and the lower elastic member is connected to the bobbin and another end of each of the upper elastic member and the lower elastic member is connected to the holder member; and a detection sensor arranged at a position facing the magnet of the bobbin and detecting change in magnetic force of the magnet due to displacement of the bobbin, wherein a surface of the magnet facing the bobbin and a surface of the magnet opposite to the surface facing the bobbin may be magnetized in polarities different from each other, and an upper portion of the magnet and a lower portion of the magnet may be magnetized in lengths and polarities different from each other.

In some exemplary embodiments, the magnet may include: a first magnet portion and a second magnet portion respectively arranged at an upper portion of the magnet; and a third magnet portion and a fourth magnet portion respectively arranged at a lower portion of the magnet, wherein sizes of the third magnet portion and the fourth magnet portion may formed larger than sizes of the first magnet portion and the second magnet portion.

In some exemplary embodiments, a size of the first magnet portion may be formed equal to a size of the second magnet portion, and a size of the third magnet portion may be formed equal to a size of the fourth magnet portion.

In some exemplary embodiment, a polarity of the first magnet portion may be same as a polarity of the fourth magnet portion, and a polarity of the second magnet portion may be same as a polarity of the third magnet portion.

In some exemplary embodiment, a polarity of the first magnet portion may be opposite to a polarity of the third magnet portion, and a polarity of the second magnet portion may be opposite to a polarity of the fourth magnet portion.

In some exemplary embodiments, each of the first magnet portion and the fourth magnet portion may have an N-polarity, and each of the second magnet portion and the third magnet portion may have an S-polarity.

In some exemplary embodiments, the detection sensor may be arranged at a position facing the second magnet portion and the fourth magnet portion, and may be center-aligned to a boundary line between the second magnet portion and the fourth magnet portion.

In some exemplary embodiments, a center of a sensing surface of the detection sensor may be aligned to a boundary line between the second magnet portion and the fourth magnet portion.

In some exemplary embodiments, the detection sensor may be a Hall sensor.

In another general aspect, there is provided a camera module, the camera module may comprise: an image sensor, a printed circuit board installed with the image sensor; and a lens driving device configured as described in the above.

In still another general aspect, there is provided a lens driving device, the lens driving device comprising: a holder member; a bobbin disposed at an inner side of the holder member; a magnet disposed at the holder member; a first coil unit disposed at the bobbin, and facing the magnet; a first support member coupled to the holder member and the bobbin; and a detection sensor disposed at the bobbin, and detecting magnetic force of the magnet, wherein the magnet may include a facing surface facing the bobbin and an opposite surface disposed at an opposite side of the facing surface, wherein a polarity of the facing surface and a polarity of the opposite surface may be different from each other, and wherein a polarity of an upper portion of the facing surface and a polarity of a lower portion of the facing surface may be different from each other.

In some exemplary embodiments, the magnet may include a first magnet portion disposed at an outer upper portion and having a first polarity, a second magnet portion disposed at an inner upper portion and having a second polarity different from the first polarity, a third magnet portion disposed at an outer lower portion and having the second polarity, and a fourth magnet portion disposed at an inner lower portion and having the first polarity.

In some exemplary embodiments, lengths in up and down directions of the first magnet portion and the second magnet portion may be shorter than lengths in up and down directions of the third magnet portion and the fourth magnet portion.

In some exemplary embodiments, widths of the first magnet portion and the third magnet portion may correspond to widths of the second magnet portion and the fourth magnet portion.

In some exemplary embodiments, a size of the first magnet portion may correspond to a size of the second magnet portion, and a size of the third magnet portion may correspond to a size of the fourth magnet portion.

In some exemplary embodiments, each of the first magnet portion and the fourth magnet portion may have an N-polarity, and each of the second magnet portion and the third magnet portion may have an S-polarity.

In some exemplary embodiments, the detection sensor may face at least one of the second magnet portion and the fourth magnet portion.

In some exemplary embodiments, the detection sensor may be disposed on a virtual straight line extended from a boundary line between the second magnet portion and the fourth magnet portion.

In some exemplary embodiments, a center of a sensing portion of the detection sensor may be disposed on a virtual straight line extended from a boundary line between the second magnet portion and the fourth magnet portion, in an initial state where electric power is not supplied to the first coil unit.

In some exemplary embodiment, the first coil unit and the detection sensor may be disposed at an outer circumferential surface of the bobbin, and the detection sensor may be disposed at an upper side of the first coil unit.

In some exemplary embodiments, the magnet may be fixed to an inner lateral surface of the holder member, and the first coil unit may be fixed to an outer lateral surface of the bobbin.

In some exemplary embodiments, the lens driving device may further comprise: a base disposed at a lower side of the holder member; a first circuit board disposed at an upper surface of the base; a second coil unit electrically conducted to the first circuit board, and facing the magnet; and a second support member supporting the holder member in relation to the base.

In some exemplary embodiments, the lens driving device may further comprise: a second circuit board installed with the detection sensor, and disposed at the bobbin, wherein the second circuit board may be electrically conducted to the first support member, the second support member, and the first circuit board.

In some exemplary embodiments, the facing surface and the opposite surface may be magnetized in polarities different from each other, and an upper portion of the magnet and a lower portion of the magnet may be magnetized in lengths and polarities different from each other.

In still another general aspect, there is provided a camera module, the camera module comprising: a holder member; a bobbin disposed at an inner side of the holder member; a magnet disposed at the holder member; a first coil unit disposed at the bobbin, and facing the magnet; a first support member coupled to the holder member and the bobbin; and a detection sensor disposed at the bobbin, and configured to detect magnetic force of the magnet, wherein the magnet may include a facing surface facing the bobbin and an opposite surface disposed at an opposite side of the facing surface, wherein a polarity of the facing surface and a polarity of the opposite surface may be different from each other, and wherein a polarity of an upper portion of the facing surface and a polarity of a lower portion of the facing surface may be different from each other.

In still another general aspect, there is provided an optical apparatus, the optical apparatus comprising: a holder member; a bobbin disposed at an inner side of the holder member; a magnet disposed at the holder member; a first coil unit disposed at the bobbin, and facing the magnet; a first support member coupled to the holder member and the bobbin; and a detection sensor disposed at the bobbin, and configured to detect magnetic force of the magnet, wherein the magnet may include a facing surface facing the bobbin and an opposite surface disposed at an opposite side of the facing surface, wherein a polarity of the facing surface and a polarity of the opposite surface may be different from each other, and wherein a polarity of an upper portion of the facing surface and a polarity of a lower portion of the facing surface may be different from each other.

According to an exemplary embodiment, the magnet can be configured in asymmetric magnetization. Therefore, the Hall sensor may be arranged at a center position where the N-pole and the S-pole intersect with each other to set an initial position. Thereby, assemblability of the product can be enhanced.

In addition, according to an exemplary embodiment, a bipolar-magnetized magnet may be used. Thereby, higher Hall output can be obtained.

In addition, according to an exemplary embodiment, the asymmetric magnet allows use of a unidirectional coil unit. Therefore, it is advantageous for winding up of the coil unit.

DETAILED DESCRIPTION

Figure 1:
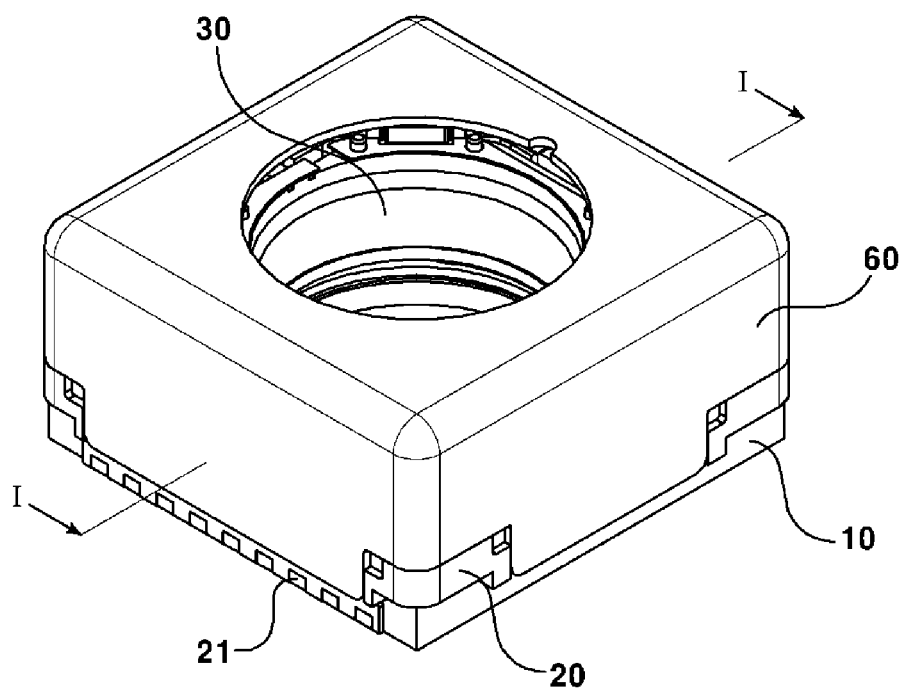
FIG. 1 is a schematic perspective view illustrating a camera module according to an exemplary embodiment.

Hereinafter, some exemplary embodiments will be described with reference to the exemplary drawings. In designating elements in the drawings as reference numerals, wherever possible, the same reference numerals are used to refer to the same element, even though the same elements are illustrated in different drawings. In addition, in describing exemplary embodiments of the present disclosure, when it is determined that a detailed description about known function or structure relating to the present disclosure may disturb understanding of exemplary embodiments of the present disclosure, the detailed description may be omitted.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element.

As used herein, the term "optical axis direction" is defined as a direction of an optical axis of a lens module installed at a lens actuator. Meanwhile, the term "optical axis direction" may be used in combination with the terms such as "up/down direction", "z-axis direction", etc.

As used herein, the term "auto focus function" is defined as a function to focus on the subject by moving the lens module in the optical axis direction according to distance to the subject to adjust the distance between an image sensor and the subject, in order to form a clear image on the image sensor. Meanwhile, the term "auto focus" may be used in combination with the term "AF (Auto Focus)".

As used herein, the term "handshake compensation function" is defined as a function to move or tilt the camera module in a direction perpendicular to the optical axis direction so as to counterbalance trembling (motion) generated by the image sensor due to external force. Meanwhile, the term "handshake compensation" may be used in combination with the term "OIS (Optical Image Stabilization)".

Hereinafter, a structure of an optical apparatus according to an exemplary embodiment will be described.

An optical apparatus according to an exemplary embodiment may be any one of a mobile phone, a smart phone, a portable smart device, a digital camera, a laptop computer, a digital broadcasting device, a PDA (Personal Digital Assistant), a PMP (Portable Multimedia Player), and a navigation device, but not limited hereto. Thus, any kind of device to photograph a picture or motion picture may be the optical apparatus.

The optical apparatus according to an exemplary embodiment may include a main body (not illustrated in the drawings), a display unit (not illustrated in the drawings) configured to display information by being arranged at a surface of the main body, and a camera (not illustrated in the drawings) having a camera module (not illustrated in the drawings) configured to photograph a picture or motion picture by being installed at the main body.

Hereinafter, a structure of the camera module according to an exemplary embodiment will be described.

The camera module may include a lens driving device (not illustrated in the drawings), a lens module (not illustrated in the drawings), an infrared cut-off filter (not illustrated in the drawings), a printed circuit board (not illustrated in the drawings), an image sensor (not illustrated in the drawings), and a controller (not illustrated in the drawings).

The lens module may include at least one lens (not illustrated in the drawings) and a lens barrel accommodating the at least one lens. However, one structure of the lens module is not limited to the lens barrel, but any kind of holder structure capable of supporting the at least one lens may be available. The lens module may move along with a lens driving device by being coupled to the lens actuating unit. As an example, the lens module may be screw-coupled to the lens driving device. As another example, the lens module may be coupled to the lens driving device using an adhesive (not illustrated in the drawings). Meanwhile, light that has passed through the lens module may be irradiated to an image sensor.

The infrared cut-off filter may block light in an infrared area from being incident on the image sensor. As an example, the infrared cut-off filter may be disposed between the lens module and the image sensor. The infrared cut-off filter may be installed at a base (20) to be described hereinafter. The infrared cut-off filter may be coupled to a holder member (not illustrated in the drawings). The infrared cut-off filter may be installed at a through-hole formed on a center portion of the base (20). As an exemplary embodiment, the infrared cut-off filter may be formed of a film material or a glass material. Meanwhile, as an exemplary embodiment, the infrared cut-off filter may be formed by a process where a kind of infrared cut-off coating material is coated on a flat optical filter such as a cover glass for image plane protection.

The printed circuit board may support the lens driving device. The image sensor may be mounted on the printed circuit board. As an example, the image sensor may be disposed at an internal side of an upper surface of the printed circuit board, and a sensor holder (not illustrated in the drawings) may be disposed at an external side of an upper surface of the printed circuit board. The lens driving device may be disposed at an upper side of the sensor holder.

Alternatively, the lens driving device may be disposed at an external side of an upper surface of the printed circuit board, and the image sensor may be disposed at an internal side of an upper surface of the printed circuit board. Through such structure, the light that has passed through the lens module coupled at an inner side of the lens actuating unit may be irradiated to the image sensor mounted on the printed circuit board. The printed circuit board may supply electric power to the lens driving device. Meanwhile, the controller for controlling the lens driving device may be disposed at the printed circuit board.

The image sensor may be mounted on the printed circuit board. The image sensor may be disposed to have the same optical axis with the lens module. Through such structure, the image sensor may obtain the light that has passed through the lens module. The image sensor may output the irradiated light as a picture. As an example, the image sensor may be any one of a CCD (charge coupled device), an MOS (metal oxide semi-conductor), a CPD (charge priming device) and a CID (charge injection device), but not limited hereto.

The controller may be mounted on the printed circuit board. The controller may be disposed at an external side of the lens driving device. Alternatively, controller may be disposed at an internal side of the lens driving device. The controller may control direction, intensity and amplitude of electrical current supplied to each structural element forming the lens driving device. The controller may control the lens driving device to perform at least any one of auto focus function or handshake compensation function of the camera module. That is, the controller may control the lens driving device to move the lens module in an optical axis direction or in a direction perpendicular to the optical axis direction, or to tilt the lens module. Furthermore, the controller may perform feedback control of the auto focusing function and the handshake compensation function.

More particularly, the controller may receive a position of a bobbin (30) or a holder member (40) detected by the sensor unit (100), to control electric power or current applied to a first coil (31) and a second coil (23). Thereby, more precise auto focus function and/or handshake compensation function can be provided.

Hereinafter, a structure of a lens driving device according to an exemplary embodiment will be described with reference to the enclosed drawings.

Figure 2:
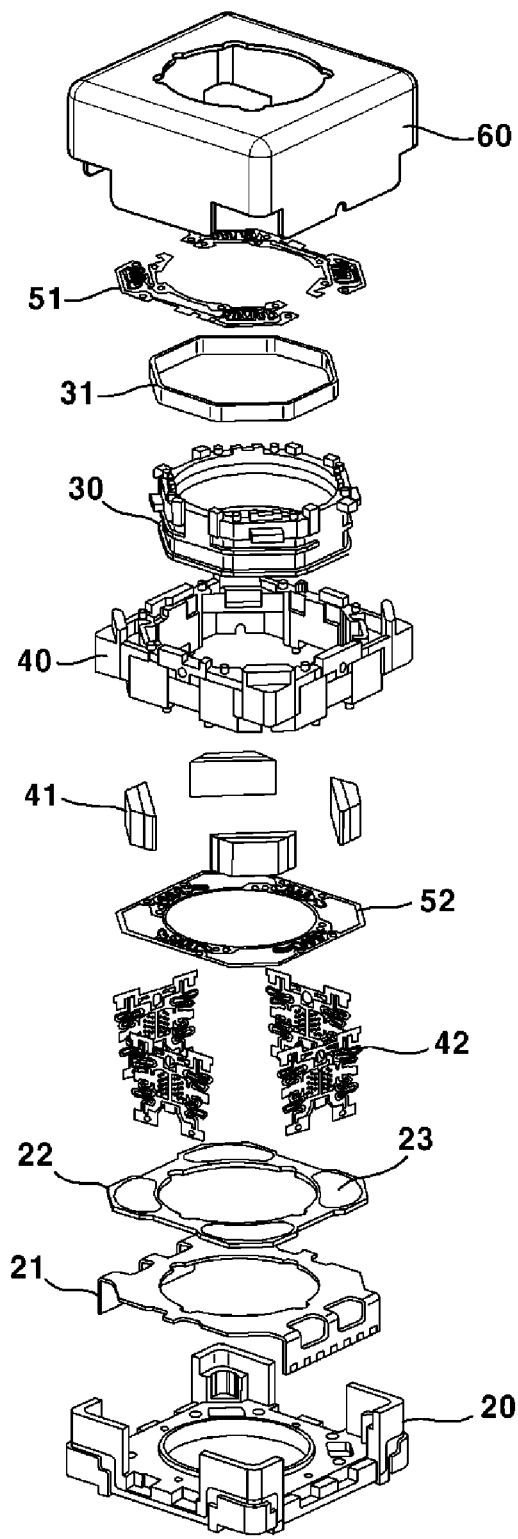
FIG. 2 is an exploded perspective view of FIG. 1.

FIG. 1 is a schematic perspective view illustrating a camera module according to an exemplary embodiment; FIG. 2 is an exploded perspective view of FIG. 1; and FIG.

3 is a cross-sectional view illustrating a lens driving device according to an exemplary embodiment.

The lens driving device according to an exemplary embodiment may include a first lens driving unit and a second lens driving unit. Here, the first lens driving unit may be a lens driving unit for auto-focusing function, and the second lens driving unit may be a lens driving unit for handshake compensation function.

As illustrated in FIG. 2, the first lens driving unit may include a base (20), a bobbin (30), and a holder member (40). In addition, the first lens driving unit may further include a cover member (60) forming an outer contour of the camera module. Here, the holder member (40) supporting a magnet (41) (to be described hereinafter) may be arranged an internal side of the cover member (60).

The base (20) may be coupled to the cover member (60).

The bobbin (30) may be installed in an internal space of the cover member (60), as being reciprocatively movable in an optical axis direction. A first coil (31) may be installed in a coil accommodating portion formed on an outer circumferential surface of the bobbin (30).

An upper (51) and a lower elastic member (52) may be installed on an upper portion and a lower portion of the bobbin (30), respectively. An end of the upper elastic member (51) may be connected to the bobbin (30), and another end of the upper elastic member (51) may be coupled to the holder member (40), but not limited hereto. The other end of the upper elastic member (51) may be coupled to the cover member (60), as circumstances require. The other end of the upper elastic member (51) may be coupled to an upper surface or a lower surface of the holder member (40), when coupled to the holder member (40). An end of the lower elastic member (52) may be connected to the bobbin (30), and another end of the lower elastic member (51) may be coupled to an upper surface of the base, or may be coupled to a lower surface of the holder member (40).

In addition, a protrusion may be formed on a lower side of the base (20) so as to couple the lower elastic member (52). A hole or recess may be formed on the lower elastic member (52), on a position corresponding to the position of the protrusion, so as to fix the lower elastic member by the coupling between the protrusion and the hole or recess. In addition, an adhesive may be additionally used for stronger coupling. The protrusion and the elastic member may be coupled to each other by thermos-welding.

Meanwhile, as illustrated in FIG. 2, the upper elastic member (51) may be provided as two springs in a bi-divisional structure. The lower elastic member (52) may be formed a single body, so as to function as a terminal to be applied with current. That is, the current applied through a terminal (not illustrated in the drawings) may be delivered through two springs of the upper elastic member (52), and the delivered current may be applied to the first coil (31) wound on the bobbin (30). To this end, the upper elastic member (51) and the first coil (31) may be conductively connected using a method such as soldering, respectively.

Here, the upper elastic member (51) may include an external portion coupled to the holder member (40), an internal portion coupled to the bobbin, and a connecting portion connecting the internal portion and the external portion. The internal portion may be electrically connected to both distal ends of the first coil (31) via soldering. That is, the both distal ends of the two springs and the first coil (31) may be electrically connected using means such as soldering, Ag epoxy, welding, conductive epoxy, etc. However, the present disclosure is not limited hereto. Otherwise, in a reverse way, the lower elastic member (53) may be formed in a bi-divisional structure, and the upper elastic member (51) may be formed in a single body.

A bidirectional movement in an optical axis direction by the bobbin (30) may be supported by the upper and the lower elastic member (51, 52). That is, the bobbin (30) may be spaced apart from the holder member (40) at a predetermined distance, such that the bobbin (30) can be controlled to move upward and downward from an initial position of the bobbin (30) as a center. In addition, the initial position of the bobbin (30) may contact a lower surface of the holder member (40), such that the bobbin (30) can be controlled to move only upward from the initial position of the bobbin (30).

Meanwhile, the first coil (31) may be provided as a ring-shaped coil block coupled to an outer circumferential surface of the bobbin (30), but not limited hereto. That is, the first coil (31) may be directly wound on an outer circumferential surface of the bobbin (30). As illustrated in FIG. 2, the first coil (31) may be installed at a position near to a lower surface of the bobbin (30), and may include a straight surface and a curved surface according to the shape of the bobbin (30).

In addition, the first coil (31) formed as a coil block may be in an angular shape, and may be in an octagonal shape. That is, the first coil (31) may be all formed of straight surfaces with no curved surface. This is by consideration of electromagnetic interaction with the magnet (41) disposed oppositely. That is, the electromagnetic force may be maximized when both surfaces of the magnet (41) and the first coil (31) facing each other are all flat surfaces. However, the exemplary embodiment is not limited hereto. The surfaces of the magnet (41) and the first coil (31) may be formed as all curved surfaces, all flat surfaces, or one as curved surfaces and the other as flat surfaces, according to its design specification.

In addition, the bobbin (30) may include a first surface flatly formed on a surface responding to the straight surface of the first coil (31) and a second surface roundly formed on a surface responding to the curved surface of the first coil (31), such that the first coil (31) can be coupled to an outer circumferential surface of the bobbin (30), but not limited. That is, the second surface may be also formed as a flat surface.

The holder member (40) may be formed as a frame roughly in a shape of hexahedron. Coupling structures for the upper and the lower elastic member (51, 52) to be coupled may be provide on an upper and a lower surface of the holder member (40), respectively. A magnet (41) may be installed at four edge portions of the holder member (40). Here, as illustrated in FIG. 2, an accommodating portion (not illustrated in the drawings) may be formed at a position in which the magnet (41) is to be installed. However, the present disclosure is not limited hereto. That is, the magnet (41) may be adhesively fixed directly to an inner circumferential surface of the holder member (40). The magnet (41) may be fixed by bonding on a lateral surface or on an edge of the holder member (40), when the magnet (41) is directly fixed to the holder member (40) in such way as described in the above. In addition, the magnet (41) may be arranged at a plane surface portion of the holder member (40), instead of being arranged at an edge portion of the holder member (40). The magnet (41) will be described again hereinafter.

In addition, according to an exemplary embodiment, the lens driving device may include only a cover member (60), without including a separate holder member (40), in a case where the lens driving device is provided not for the handshake compensation function but for the auto focusing function. The cover member (60) may be formed of a metallic material which is a ferromagnetic substance such as iron. In addition, the cover member (60) may be provided in an angular shape when viewed from the above, so as to cover a whole of the bobbin (30). Here, as illustrated in FIGS. 1 and 2, the cover member (60) may be in a quadrilateral shape. Alternatively, although it is not illustrated in the drawings, the cover member (60) may be provided in an octagonal shape. In addition, the magnetic field emitted from edges of the holder member (40) may be minimized, in case that the cover member is in an octagonal shape when viewed from the above and the magnet arranged at an edge of the holder member (40) is in a trapezoid shape when viewed from the above.

Figure 3:
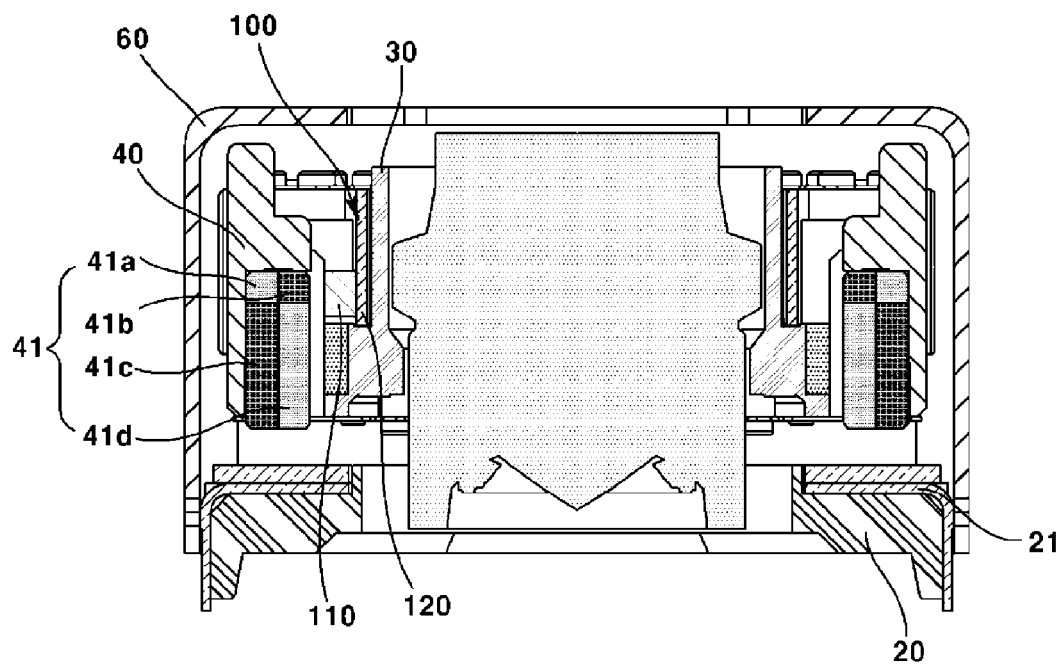
FIG. 3 is a cross-sectional view illustrating a lens driving device according to an exemplary embodiment.

According to an exemplary embodiment, as illustrated in FIG. 3, the magnet (41) may be formed in an asymmetric magnetization structure. The magnet (41) may include first to fourth magnet portions (41a)(41b)(41c)(41d). Here, the first magnet portion (41a) and the second magnet portion (41b) may be arranged at an upper portion of the magnet (41), and the third magnet portion (41c) and the fourth magnet portion (41d) may be arranged at a lower portion of the magnet (41). Here, the size of the first magnet portion (41a) and the second magnet portion (41b) may be formed relatively smaller than the size of the third magnet portion (41c) and the fourth magnet portion (41d).

In addition, the first magnet portion (41a) and the second magnet portion (41b) may be magnetized in polarities different from each other. The third magnet portion (41c) and the fourth magnet portion (41d) may also be magnetized in polarities different from each other. Here, the first magnet portion (41a) and the third magnet portion (41c) may be arranged outward of the magnet (41), to face the cover member (60). The second magnet portion (41b) and the fourth magnet portion (41d) may be arranged inward of the magnet (41), to face an outer circumferential surface of the bobbin (30).

Among the first to fourth magnet portions (41a)(41b)(41c)(41d), each of the magnet portions adjacent to each other may respectively have a polarity different from each other. As an example, as illustrated in FIG. 3, the second magnet portion (41b) may be magnetized in S-pole, while the first magnet portion (41a) is magnetized in N-pole. At the same time, the third magnet portion (41c) may be magnetized in S-pole, while the fourth magnet portion (41d) is magnetized in N-pole. However, the present disclosure is not limited hereto. The first to fourth magnet portions (41a)(41b)(41c)(41d) may be magnetized in reverse order, as long as each of the magnet portions adjacent to each other respectively has a polarity different from each other.

In addition, the lens driving device according to an exemplary embodiment may include a sensor unit (100) detecting motions of the bobbin (30).

The sensor unit (100) may include a detection sensor (110) and a substrate (120) on which the detection sensor (110) is to be mounted. The detection sensor (110) may include a Hall sensor (Hall IC), but not limited hereto. Thus, any sensor capable of detecting magnetic force may be provided as the detection sensor (110). The detection sensor (110) may be installed at an outer circumferential surface of the bobbin (30). According to an exemplary embodiment, the detection sensor (110) may be arranged at an upper side of the first coil (31). Furthermore, the detection sensor (110) may be arranged such that a boundary line between the second magnet portion (41b) and the fourth magnet portion (41d) is aligned to a center of the detection sensor (110).

Here, the detection sensor (110) may include a sensing portion detecting magnetic force and a housing accommodating the sensing portion. The center of the detection sensor (110) may be defined as the center of the sensing portion, or may be defined as the center of the housing. Here, the center position of the detection sensor (110) may be marked by a marker at the center position of the housing, such that the center position can be easily found from the outside.

Meanwhile, in arranging the boundary line to be a center of the sensing portion of the detection sensor (110), the boundary line may be arranged close to the center in some degree, even though the boundary line is not exactly aligned to the center of the detection sensor (110). The center of the detection sensor (110) may be disposed on a virtual straight line extended from a boundary line between the second magnet portion (41b) and the fourth magnet portion (41d). Alternatively, the center of the detection sensor (110) may be arranged adjacent to the virtual straight line extended from a boundary line between the second magnet portion (41b) and the fourth magnet portion (41d).

Via such structure, the detection sensor (110) may be operated in bipolar mode to detect motions of the second magnet portion (41b) and the fourth magnet portion (41d) more effectively. In addition, the center line of the detection sensor (110) may be aligned based on the boundary line between the second magnet portion (41b) and the fourth magnet portion (41d) during assembly stage. Thereby, the product can be assembled more precisely.

Meanwhile, the first lens driving unit may be formed as described in the above. Alternatively, the first lens driving unit may be replaced with an optical system implementing auto-focusing function having another structure rather than the structure described in the above. That is, the first lens driving unit may be formed of an optical module using a single-lens moving actuator, a liquid lens actuator or an actuator of variable reactive index type, instead of using an auto-focusing actuator of voice coil motor type. That is, any kind of optical actuator which is able to perform auto-focusing function may be used in the first lens driving unit.

Meanwhile, the second lens driving unit may be a lens driving unit for handshake compensation function. The second lens driving unit may include a first lens driving unit, a base, a lateral support member (42), a first circuit board (21), a second coil (23), and a second location detection sensor (21a). Alternatively, the second lens driving unit may include a second circuit board (22), such that the second coil (23) is arranged at the second circuit board (22).

According to an exemplary embodiment, a control element to drive the lens driving device may be installed at the first circuit board (21). A second coil (23) in a pattern shape may be formed on the second circuit board (22). The first and the second circuit board (21, 22) may be conductively connected to each other. The second circuit board (22) may be arranged by being laminated on an upper side of the first circuit board (21). However, the present disclosure is not limited hereto. Only the first circuit board (21) may be provided, and the second circuit board (22) may be omitted. In such case, the second coil (23) may be assembled on the first circuit board (21) as a separate component. As illustrated in FIG. 2, the first circuit board (21) may be provided as an FPCB (Flexible Printed Circuit Board), and may be installed at an upper surface of the base (20).

As illustrated in FIG. 2, the second circuit board (22) may be laminated on an upper surface of the first circuit board (21), and may adhere to the first circuit board (21).

The second coil (23) may move shift the whole of the first lens driving unit to be moved in a flat surface direction perpendicular to the optical axis, via an interaction with the magnet (41). As illustrated in FIG. 2, the second coil (23) may be formed on the second circuit board (22) by a pattern coil method. The second coil (23) may be arranged at each of edge portions of the second circuit board (22), as a position responding to that of the third magnet portion (41c) and the fourth magnet portion (41d) arranged at a bottom surface of the magnet (41).

As described in the above, according to an exemplary embodiment, the time required for auto-focusing operation and handshake compensation operation may be reduced, because motions of the bobbin (30) in the optical axis direction can be received as a feedback using the sensing unit (100).

In addition, according to an exemplary embodiment, the magnet (41) can be configured in asymmetric magnetization structure including the first to fourth magnet portion (41a-41d) having polarities different from each other, while the installation position of the detection sensor (110) is center-aligned to the boundary line between the second magnet portion (41b) and the fourth magnet portion (41d). Thereby, it is advantageous to position the detection sensor (110) during the assembly process.

In addition, according to an exemplary embodiment, the higher Hall output may be obtained by the bipolar-magnetized magnet. Thereby, the detective precision can be enhanced. In addition, according to an exemplary embodiment, the asymmetric-magnetized magnet (41) may be used such that the first coil (31) can be formed of a unidirectional coil. Therefore, it is advantageous for winding up of the coil.

Meanwhile, according to an exemplary embodiment, the lens driving device formed as illustrated in FIGS. 1 to 3 may be controlled by both unidirectional and bidirectional control. That is, the base (20) and the bobbin (30) may be arranged by adhering onto their initial position. For example, a stopper may be form the initial position by being protruded on the holder member (40) and contacting with a bottom surface of the bobbin (30). Alternatively, although it is not illustrated in the drawings, the stopper may be protruded on the bottom surface of the bobbin (30) and may be arranged by contacting with an upper surface of the base (20). In addition, a predetermined prepress may be applied to the upper and the lower elastic member (51, 52), such that the initial position of the bobbin (30) can adhere to the base (20), in a case where the lens driving device is controlled by the unidirectional control. Thus, the bobbin (30) may move upward by the electromagnetic interaction, when electric power is applied. Otherwise, the bobbin (30) may return to the initial position by the restoring force of the upper and the lower elastic member (51, 52), when the electric power is shut off. Here, the upper and lower elastic member (51, 52) may be also referred to as 'first support member', and the lateral support member (42) may be also referred to as 'second support member'.

Alternatively, the base (20) and the bobbin (30) may be arranged by being spaced apart from the initial position at a predetermined distance. In such case, the upper and lower elastic member (51, 52) may be formed in a flat shape with no prepress applied. Otherwise, the upper and lower elastic member (51, 52) may be formed with a predetermined prepress applied. In such case, the bobbin (30) may move upward or downward according to the polarity of current, when the electric power is applied in the initial state where the bobbin (30) is spaced apart from the base (20) at a predetermined distance. That is, the bobbin (30) may ascend from the initial position as a standard, when normal current is applied. In addition, the bobbin (30) may descend from the initial position as a standard, when reverse current is applied.

As described in the above, according to an exemplary embodiment, time required for the auto-focusing operation may be minimized in performing auto-focusing function by controlling the bobbin (30) to ascend upward or descend downward, because more accurate position of the bobbin (30) can be detected using the detection sensor (110).

The camera module may include a lens driving device formed as described in the above, a lens barrel (not illustrated in the drawings) coupled to the bobbin (30), and a printed circuit board (10). Here, an image sensor may be mounted on the printed circuit board. The printed circuit board may form a bottom surface of the camera module.

The bobbin (30) may include a lens barrel. At least one lens may be installed in the lens barrel. The lens barrel may be screw-coupled to an inside of the bobbin (30), but not limited hereto. The lens barrel may be fixed to an inside of the bobbin (30) by other means than the screw-coupling. Alternatively, one or more lenses may be integrally formed with the bobbin (30) as a single body, without including the lens barrel. The lens may be formed of a single piece, or otherwise, may be formed of two or more lenses composing an optical system.

The base (20) may further include an infrared cut-off filter installed at a position responding to that of the image sensor. The base (20) may be coupled to the holder member (40). In addition, the base (20) may support a lower side of the holder member (40). A separate terminal member may be installed on the base (20), in order for conductivity with the printed circuit board. The terminal may be integrally formed with the base (20) using such as surface electrodes. Meanwhile, the base (20) may function as a sensor holder to protect the image sensor. In such case, a protrusion may be formed in a downward direction along a lateral surface of the base (20). However, this is not an essential structure. Therefore, although it is not illustrated in the drawings, a separate sensor holder may be arranged at a lower portion of the base (20) and function as the sensor holder.

In the above, exemplary embodiments of the present disclosure have been described. However, these embodiments are merely examples and do not limit the present invention, so that persons who skilled in the art of the present disclosure may easily transform and modify within the limit of the technical spirit of the present disclosure. For example, each of the components shown in detail in the embodiments of the present invention may be implemented in transformation. In addition, the differences relating these transformations and modifications shall be regarded to be included in the scope of the present disclosure as defined in the attached claims of the present disclosure and the equivalents thereof.

What is claimed is:

1. A lens driving device, comprising:
 a holder member;
 a bobbin disposed in the holder member and configured to move in a vertical direction;
 a magnet disposed on the holder member;
 a first coil unit disposed on the bobbin;
 a first support member coupled to the holder member and the bobbin;
 a detection sensor disposed on the bobbin; and
 a base disposed below the holder member;
 wherein the magnet comprises a first magnet portion disposed at an outer upper portion of the magnet and having a first polarity, a second magnet portion disposed at an inner upper portion of the magnet and having a second polarity different from the first polarity, a third magnet portion disposed at an outer lower portion of the magnet and having the second polarity, and a fourth magnet portion disposed at an inner lower portion of the magnet and having the first polarity;

wherein the first coil unit and the detection sensor are disposed at an outer circumferential surface of the bobbin, wherein the first coil unit is disposed below the detection sensor, and wherein the detection sensor faces at least a part of the second magnet portion and the first coil faces the fourth magnet portion.

2. The lens driving device of claim 1, wherein a length of the second magnet portion in the vertical direction is shorter than a length of the fourth magnet portion in the vertical direction.

3. The lens driving device of claim 1, wherein widths of the first magnet portion and the third magnet portion correspond to widths of the second magnet portion and the fourth magnet portion, respectively.

4. The lens driving device of claim 1, wherein a size of the first magnet portion corresponds to a size of the second magnet portion, and a size of the third magnet portion corresponds to a size of the fourth magnet portion.

5. The lens driving device of claim 1, wherein the first polarity is an N-polarity, and the second polarity is an S-polarity.

6. The lens driving device of claim 1, wherein the detection sensor is disposed on a virtual straight line extended from a boundary line between the second magnet portion and the fourth magnet portion.

7. The lens driving device of claim 6, wherein a center of a sensing portion of the detection sensor is disposed on a virtual straight line extended from a boundary line between the second magnet portion and the fourth magnet portion, in an initial state where electric power is not supplied to the first coil unit.

8. The lens driving device of claim 1, wherein the magnet is fixed to an inner lateral surface of the holder member, and the first coil unit is fixed to an outer lateral surface of the bobbin.

9. The lens driving device of claim 1, further comprising:
a first circuit board disposed on an upper surface of the base;
a second coil unit electrically connected to the first circuit board, and facing the magnet; and
a second support member supporting the holder member.

10. The lens driving device of claim 9, further comprising:
a second circuit board installed with the detection sensor, and disposed at the bobbin,
wherein the second circuit board is electrically connected to the first support member, the second support member, and the first circuit board.

11. The lens driving device of claim 1, wherein the first coil does not face the second magnet portion.

12. The lens driving device of claim 1, wherein the detection sensor faces at least a part of the fourth magnet portion.

13. The lens driving device of claim 1, wherein an area of a surface of the second magnet portion facing the detection sensor is smaller than an area of a surface of the fourth magnet portion facing the first coil unit.

14. A camera module, comprising:
a holder member;
a bobbin disposed in the holder member and configured to move in a vertical direction;
a magnet disposed on the holder member;
a first coil unit disposed on the bobbin;
a first support member coupled to the holder member and the bobbin;
a detection sensor disposed on the bobbin; and
a base disposed below the holder member;
wherein the magnet comprises a first magnet portion disposed at an outer upper portion of the magnet and having a first polarity, a second magnet portion disposed at an inner upper portion of the magnet and having a second polarity different from the first polarity, a third magnet portion disposed at an outer lower portion of the magnet and having the second polarity, and a fourth magnet portion disposed at an inner lower portion of the magnet and having the first polarity;
wherein the first coil unit and the detection sensor are disposed at an outer circumferential surface of the bobbin,
wherein the first coil unit is disposed below the detection sensor, and
wherein the detection sensor faces at least a part of the second magnet portion and the first coil faces the fourth magnet portion.

15. The camera module of claim 14, wherein a length of the second magnet portion in the vertical direction is shorter than a length of the fourth magnet portion in the vertical direction.

16. The camera module of claim 14, wherein the detection sensor is disposed on a virtual straight line extended from a boundary line between the second magnet portion and the fourth magnet portion.

17. The camera module of claim 14, wherein the first coil does not face the second magnet portion.

18. The camera module of claim 14, wherein the detection sensor faces at least a part of the fourth magnet portion.

19. The camera module of claim 14, wherein an area of a surface of the second magnet portion facing the detection sensor is smaller than an area of a surface of the fourth magnet portion facing the first coil unit.

20. An optical apparatus, comprising:
a holder member;
a bobbin disposed in the holder member and configured to move in a vertical direction;
a magnet disposed on the holder member;
a first coil unit disposed on the bobbin;
a first support member coupled to the holder member and the bobbin;
a detection sensor disposed on the bobbin; and
a base disposed below the holder member;
wherein the magnet comprises a first magnet portion disposed at an outer upper portion of the magnet and having a first polarity, a second magnet portion disposed at an inner upper portion of the magnet and having a second polarity different from the first polarity, a third magnet portion disposed at an outer lower portion of the magnet and having the second polarity, and a fourth magnet portion disposed at an inner lower portion of the magnet and having the first polarity;
wherein the first coil unit and the detection sensor are disposed at an outer circumferential surface of the bobbin,
wherein the first coil unit is disposed below the detection sensor, and wherein the detection sensor faces at least a part of the second magnet portion and the first coil faces the fourth magnet portion.

* * * * *